July 19, 1955

F. FAULHABER 2,713,293

RELEASE KEY FOR FOLDING PHOTOGRAPHIC CAMERAS

Filed May 2, 1951

INVENTOR.
FRITZ FAULHABER
BY Mock & Blum
ATTORNEYS

July 19, 1955     F. FAULHABER     2,713,293
RELEASE KEY FOR FOLDING PHOTOGRAPHIC CAMERAS Filed May 2, 1951     3 Sheets-Sheet 2

INVENTOR.
FRITZ FAULHABER
BY *Mock + Blum*
ATTORNEYS

July 19, 1955    F. FAULHABER    2,713,293
RELEASE KEY FOR FOLDING PHOTOGRAPHIC CAMERAS
Filed May 2, 1951    3 Sheets-Sheet 3

INVENTOR
FRITZ FAULHABER
BY  Mock & Blum
ATTORNEYS

United States Patent Office 2,713,293
Patented July 19, 1955

2,713,293

RELEASE KEY FOR FOLDING PHOTOGRAPHIC CAMERAS

Fritz Faulhaber, Schonthal Bezirk Boblingen, Germany, assignor to Voigtlander & Sohn Aktiengesellschaft, Braunschweig, Germany, a corporation of Germany Application May 2, 1951, Serial No. 224,104

Claims priority, application Switzerland May 11, 1950

8 Claims. (Cl. 95—32)

This invention relates to a release system for photographic cameras and has particular relation to a release system in which, in addition to the release of the shutter and actuation of double-exposure prevention, a further function is assigned to the release key of a photographic camera.

The main object of the present invention is to provide a release system for photographic cameras, in which the stroke of the release key simultaneously actuates the means for double-exposure prevention, and serves also for releasing the locking means of the camera cover and thus for opening the camera.

Another object of my present invention consists in providing a release system of the above mentioned type, in which the functions of the pin of the release key are different in closed position from its functions in open position ready for exposure, of the camera.

It is also an object of my invention to provide a release system of the beforementioned type, the release key of which acts during the same control stroke on the shutter release and the locking means of the film-transport, in the open, ready for action position of the camera.

Still another object of my invention is to provide a release system of the above mentioned type, in which, in closed position of the camera, the release key causes release of the locking means of the camera cover.

Further objects and the advantages of the invention will be apparent from the appended claims and drawings and the following specification, which illustrate, by way of example, some embodiments of the invention.

It is known to use the stroke of the release key in photographic cameras for the simultaneous actuation of double-exposure prevention. According to the present invention a further function is assigned to the release key, which consists in releasing the locking means of the camera cover, so that the closed camera can be opened by the application of pressure to the release key.

The release keys of known camera constructions do not have this function and in these known constructions any actuation of the release key in closed condition of the camera has been either made inoperative or prevented. In contrast to these known constructions, according to the present invention the pin of the release key serves for carrying out functions in the closed camera, which are different from its functions in the open camera ready for exposure. More specifically, in the open camera ready for exposure, the stroke of the pin connected with the release key is designed to actuate, by one and the same control stroke, the release of the objective shutter and, preferably simultaneously with the moment of the actual release, cause release of the film-transport locking means. On the other hand, in the closed camera, the control stroke of said pin should unlock the camera cover and release it for opening. According to the present invention this object is attained by an arrangement, in which action of release gear is prevented in a known manner, but actuation of the release pin is preserved in closed position of the camera.

It could, of course, easily happen that a release key considerably protruding from the camera case in closed position of the camera, is inadvertently actuated. In the arrangement outlined above, this would means inadvertent opening of the camera. In order to avoid such inadvertent opening, according to my invention the pin of the release means is cause to enter the camera casing to such extent that it does not substantially protrude from the casing, and remains locked in this position in the closed camera. However, in this case too, the possibility of an added displacement must be provided for, in order to effect release of the locking means of the camera cover. Therefore, the camera casing is provided with a recess, into which the pin of the release key can be depressed in the course of the added displacement. In this step, the before mentioned locking of said pin in the depressed position is also released, because, according to a further embodiment of my invention, the locking member provided for in this connection, is arranged on the camera cover which is now moved outward. Thus after the release of the cover, the pin of the release key advances to the withdrawn position which the key is supposed to occupy when the camera is in the ready for action position.

According to a further embodiment of the invention, in releasing the shutter, the pin connected with the release key abuts at a movable locking lever of the film-transport gear, said lever being independent from said pin, and carried by the camera casing; said pin causes displacement of said lever, and as a result of this, transport of the film is released, for example simultaneously with the setting of the shutter by another element.

The present invention can be applied with particular advantage to cameras which are provided with a control pin for the transport of the film, i. e. in which transport of the film is brought about by the stroke of a control member, which can be depressed in order to cause advance of the film, as described in co-pending application Serial No. 224,105, filed May 2, 1951, now abandoned, for "Combined Shutter Setting And Film Transporting Mechanism," assigned to assignee of the present application and based on Swiss application No. 56,437 of May 11, 1950. The presence of double-exposure preventing means of conventional design may not be necessary then, and an arrangement may be used, in which release of the film-transport locking means is taken care of by the control stroke of the pin of the shutter release means. In order to obtain this result, it is necessary that said unlocking practically coincidcdes with the moment of the actual release of the objective shutter. This can be likewise attained according to my present invention.

Release of the cover-locking means according to the invention is started by a member connected with the pin of the release key abutting in the course of the before mentioned added displacement at a locking lever and causing swinging of the latter. In this swinging movement, a projection or the like of an end of the lever, is removed from the locking recess of the cover and releases the latter. According to a particularly efficient and preferred embodiment of the invention, said lever is under the action of a spring which constantly tends to displace the lever to the locking position; furthermore, said spring tends to influence the locking and unlocking movement of said lever in such manner that the same spring requires only slight pressure for pressing the cover into the locked, closed position, while, on the other hand, control movement of the release pin, which brings about release of said locked condition, requires a considerably greater force for swinging the lever against the action of said spring. In order to attain this, said locking lever is not fastened at a fixed centre of rotation at the camera casing, but rests between the two ends, i. e. the pressure spring and the locking projection, said lever being freely movable to a certain extent, and sliding displaceably on the pin of the release key. The lever part extending between the guide pin and the locking end portion, is provided with two projections which engage the surface of the camera casing. One of these projections, which is located on the lower side of said lever part, is arranged near the locking end portion, while the other projection, which is located on the upper side of the lever part, is arranged near the pin of the release key. In the step of releasing the means for locking the cover, the upper point of engagement forms the point of action for the acting forces, while in the step of closing of the cover, this role is assigned to the point located on the lower surface of the lever part.

In the appended drawings, Figure 1 diagrammatically illustrates a folding camera in vertical section in a plane parallel to the optical axis. In Figure 1, the camera is opened and is in the position ready for action.

Figure 2 is a section similar to that shown in Figure 1, the folding cover being shown in closed position.

The camera shown in open position in Figure 3, is provided with cover parts, which can be opened and closed like the leaves of a door.

Figure 1:
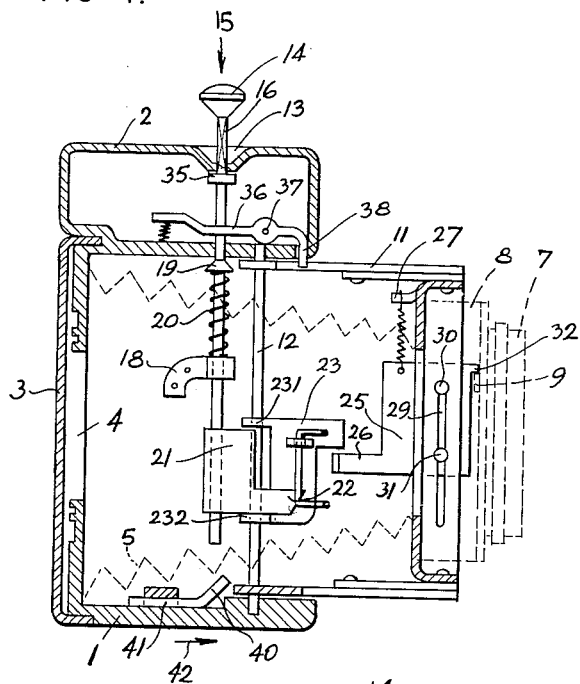

In order to clearly illustrate and explain the essential features of the invention, some of the details have been shown in simplified form in the drawings.

Figure 2:
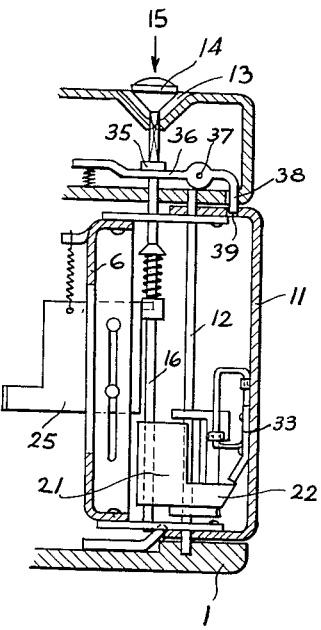

In Figures 1 and 2, the camera body is denoted by reference numeral 1, and the conventional top cover part fastened to the camera body, by reference numeral 2. 3 indicates a removable rear wall, 4 the picture window, and 5 the bellows. 6 is the objective board and 7 the objective provided with shutter 8. 9 denotes the release lever of shutter 8. Objective board 6 is fastened to folding cover 11 by means of struts 10, and the cover is capable of swinging around hinge pin or axis 12. The camera illustrated in Figures 1 and 2 belongs to the type of folding cameras, in which the spring arrangement, not shown, constantly urges base-board 11 toward the unfolded, open position. This position, in which the camera is ready for action, is illustrated in Fig. 1, while in the position illustrated in Figure 2, cover 11 is folded to the closed position. Cover 2 is provided at 13 with a recess into which release key 14 can be depressed by manual operation, in the direction of arrow 15. In the embodiment shown in the drawings, a pin 16 is fastened to the button-like release key 14. The invention may be applied also to release systems different from that shown in the drawings. Pin 16 is guided by eye 17 of a bearing 18 fastened to the camera body. Pin 16 is provided with a shoulder 19 and is encircled by helical spring 20 abutting against shoulder 19 and eye 17. This spring tends to press pin 16 constantly in the direction opposite to that of arrow 15, to the withdrawn position. A transmission member 21 is fastened to pin 16 and said member 21 is provided with a projecting part 22, the function of which will be described further below. With its upper and lower edge, said member 21 comes in engagement with eyes 231 and 232 of an intermediate slide member 23, which is guided along hinge pin 12 by said eyes 231 and 232. In this manner, members 21 and 23 are permanently in engagement brought about by their design. Member 23 is connected over a chain-link-like coupling element to cover 11, so that, upon springing the cover to closed position, member 23 is caused to swing about the common axis 12 of the cover and said member, as can be seen from Figure 2. Thus, member 23 does not prevent closing of cover 11. It will be understood that, in open position of the camera, motion of transmission member 21 is conveyed to a plane parallel with cover 11, over intermediate slide member 23. The last member of the release gear train, i. e. the release slide member 25, is located in this plane in the embodiment illustrated in Figures 1, 2. Said member 25 is provided with a projecting part 26, which extends up to under a correspondingly designed projection of member 23. Thereby, a drawspring 28 fastened at one of its ends to objective board 6 and on its other end to release slide member 25 holds the latter in such position that its projection 26 remains at a certain distance from the corresponding projection of slide member 23. Release slide member 25 is straightly guided by elongated slot 29 and pins or bolts 30 and 31. Thereby, pin 30 fixedly connected to release slide member 25 serves as a stop for limiting the motion brought about by spring 28. Slide member 25 is provided with a rudimentary projection 32, which engages release lever 9 of shutter 8 outside the camera, when release key 14 is depressed in the direction of arrow 15. The course of the transmission is easily understandable from Fig. 1. Upon springing cover 11 to closed position, release slide 25 is removed from the engagement range of slide member 23, as will be understood from Fig. 2. A spring, or the like, 33 is fastened to cover 11, and upon closing the camera this spring enters the path of projection 22 of transmission member 21. If now, in closed position of the camera, release key 14 is pressed downward in the direction of arrow 15, member 21 moves in the same direction and slides into the position shown in Fig. 2 under the bent portion of spring 33 so that key 14 becomes locked in its depressed position.

This arrangement has the advantage that key 14 does not substantially protrude beyond the periphery of the camera. A similar arrangement can be used in cameras which are provided with a control pin for rapid-transport of the film; such control pin can be likewise arrested by a stop similar to spring 33, so that it will not protrude in closed position of the camera. Upon opening the folding camera, cover 11 snaps into the position diagrammatically shown in Figure 1 and removes locking spring 33—and, likewise, the locking element of the before mentioned control pin for the rapid-transport of the film—from the range of these actuating pins. As a consequence of this, both pins are caused by their respective springs, i. e. spring 20 in Fig. 1, to move quickly into the withdrawn position.

According to the arrangement of the present invention, release of the camera cover is likewise brought about by actuation of the release key. In order to attain this, member 2 is provided with recess 13, which permits further inward pressing of key 14. Upon bringing about this added displacement, engagement of projection 22 and spring 33 is first released and, immediately hereinafter, member 35, which is fastened to pin 16 and consists of a ring in the embodiment shown, depresses an end of rocking lever 36. A preferred embodiment of lever 36 is illustrated in detail in Figure 4 and described hereinafter.

Figures 1 and 2 diagrammatically illustrate another embodiment of this lever member 36. According to these figures, this member is pivoted at the fixed point 37 of the camera, and end part 38 of lever 36 enters an opening 39 of cover 11, under the effect of spring 51' acting on the left end of lever 36. If now upon the added displacement of pin 16 and by the action of ring 35, lever 36 is caused to swing, lever end 38 will be withdrawn from opening 39 and the folding spring, not shown in the drawing, will cause snapping of cover 11 into the open position. In this procedure, the above mentioned control pin for the rapid-transport of the film would be simultaneously released.

Figure 1 also indicates that, upon actuating release key 14 in the position ready for exposure, the lower end of pin 16 abuts against inclined surface 40 of lever 41 and causes displacement of this lever in the direction of arrow 42, at a predetermined time. This lever 41 is connected to the film-transport mechanism by means not shown in the drawing. The length of pin 16 is selected in such manner that pin 16 brings about the above mentioned displacement of locking lever 40, 41, at a time close to the moment of the actual release, i. e. at the end of the release stroke, and preferably exactly at said moment. Thereby, a release (not shown) of the film-transport mechanism is brought about at this moment so that transport of the film is secured. It has been found that it is of particular advantage to design the structure in such manner that advance of the film takes place simultaneously with the repeated setting of the shutter. This can be done, for example, by the before mentioned control pin of a rapid-transport or the like. By providing the camera with these means, actuation of pin 16 and displacement of locking lever 40, 41 brought about by said actuation, will simultaneously provide also for double-exposure prevention. Furthermore, film areas which have not been exposed, will not be advanced, but only those film areas which have been exposed by the release described above.

Figure 3:
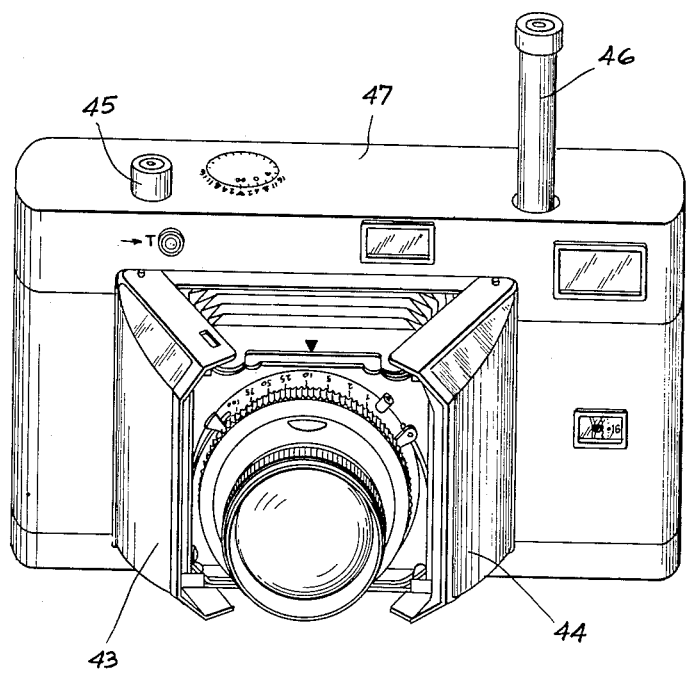
Figure 5:
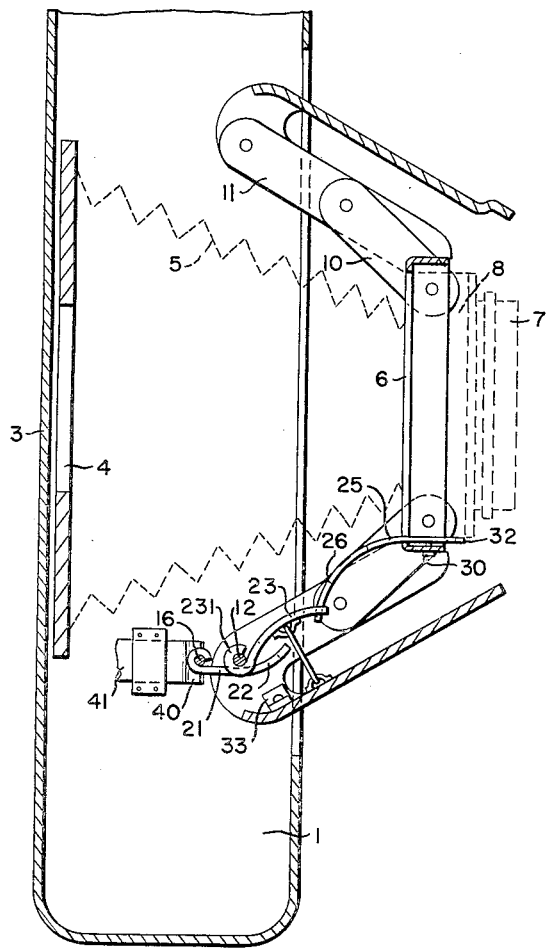
Figure 5 illustrates some parts of the device according to the invention in top view, in open position of the camera
Figure 6:
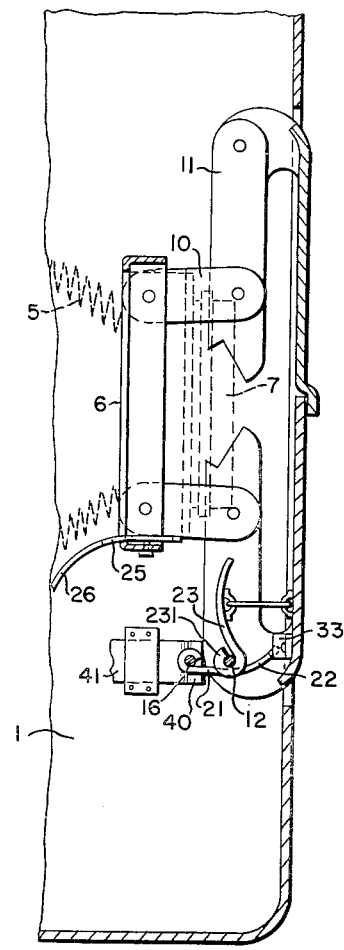
Figure 6 illustrates these parts in top view, in closed position of the camera.

Figure 3 is the view of a camera, which, in contrast to the camera shown in Figures 1 and 2, has a two-part cover 43, 44. Furthermore, in addition to the release key 45, this camera has a film-transport control pin 46, both parts 45 and 46 being shown in the protruding or withdrawn position, as the camera is opened. As will be understood from Figure 3, release key 45 is arranged on that side of the camera which is actuated by the right index finger, while control pin 46 is arranged on the side to be actuated by the left index finger. This arrangement prevents mistaking one of these control steps for the other, and the fingers need not be removed from the control organs during taking pictures.

Figure 4:
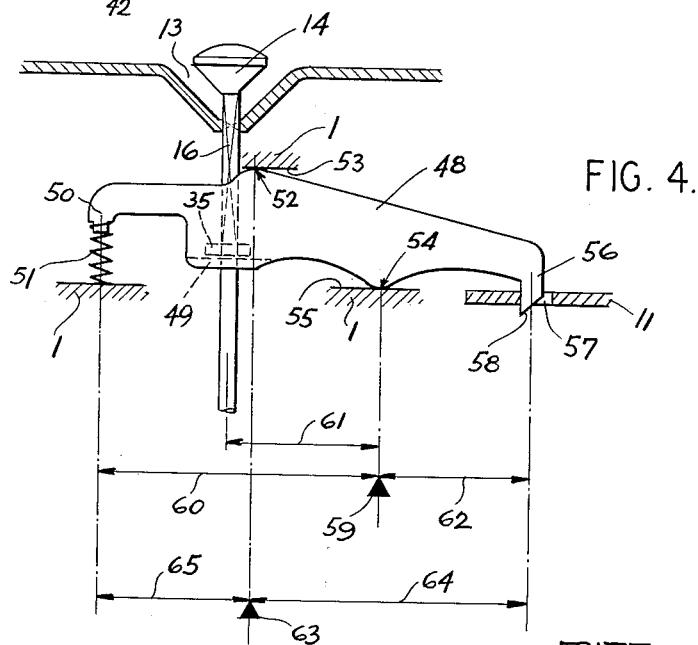
Figure 4 illustrates, in enlarged size, an embodiment of the lever which is adapted to release the closed cover for opening.

Figure 4 diagrammatically illustrates on an enlarged scale a modified, preferred embodiment of the locking lever denoted 36, 37 and 38 in Figures 1 and 2. This lever denoted 48 in Figure 4 has a special design. It extends on the left and right side of pin 16, viewed in the drawing. It is provided with a bore 49, in which pin 16 slides. The left part of lever 48 in the drawing is provided with a projection 50 and is under the action of a strong pressure spring 51, supported by camera casing 1. A specific characteristic of this embodiment consists in that lever 48 has no fixed centre of rotation at the camera casing and its right part in the drawing engages corresponding surface parts of camera casing 1 by two projections or the like. These surface portions of the camera are arranged in such manner that projection 52 of lever 48 engages surface portion 53, which is located above lever 48 and near pin 16; the other point of engagement between projection 54 of lever 48 and surface portion 55 of camera casing, is at a greater distance from pin 16, i. e. nearer to the bent projection-like end 56 of the right part of lever 48. 11 denotes the camera cover which is provided with a recess 57. Urged by spring 51, the end portion of projection 56 enters recess 57, so that cover 11 is safely held in the closed position. Projection 56 is preferably provided with an inclined end surface 58 which facilitates easy and springy insertion of end portion 56 into recess 57.

It will be understood from the above that upon exerting pressure on release key 14 in depressed position of the latter in the closed camera (see Figure 2) results in the above mentioned added displacement into recess 13 and displacement of ring 35 to such extent that upon abutting against the rim of bore 49, said ring 35 forces lever 48 downward, against the action of spring 51. In this phase, projection 54 of lever 48 is supported by camera surface portion 55. Thus, the contact point between projection 54 and surface portion 55 is the centre of rotation in the opening of the camera. By the above described downward movement of the left part of lever 48, projection 56 is withdrawn from the locking aperture 57 of cover 11, which moves quickly to the open position under the impulse of a spring not shown. Below the figure showing the design of lever 48, the mode of action of the moments occurring in the operation of lever 48, is diagrammatically illustrated in Figure 4. 59 denotes the center of rotation of lever 48 during the step of opening, 60 the effective arm of the spring, while 61 denotes the arm, on which the manually applied force applied to the release key of the camera, acts. 62 is the arm of locking projection 56. It is clear that the force necessary for opening the camera, i. e. for withdrawing projection 56 from locking aperture 57 of cover 11, must be considerable. This is desirable and proper because it helps to avoid inadvertent opening of the camera by accidentally applied, relatively slight pressure.

In the step of closing the camera, the centre of rotation is at the contact point of projection 52 and camera surface portion 53. In the diagrammatical illustration, this point is denoted by reference numeral 63. It will be understood that there is long lever arm 64 between this point and the point of action of projection 56, while a shorter lever arm 65 is functionally active between point 63 and the point of action of spring 51. This means that in locking the camera cover in the closed position, when the pressure of spring 51 must be overcome until part 58 of projection 56 engages recess 57 of the camera cover, a long lever arm 64 is active, so that only little force is necessary for closing the camera. This is also desirable, because it is an object of my invention to provide for means by which the camera can be closed quickly and easily. It will be understood from the above that folding of the camera cover into the closed position takes place easily, while opening of the cover requires a relatively greater force.

The following numerical example serves to illustrate actuation of the mechanism shown in the drawings.

It is assumed that the force of spring 51 corresponds, by way of example, to 1 kg. The distance 65 should correspond to 3 cm. and the distance 64 to 5.5 cm. The length of arm 60 of the spring should amount to 5.5 cm. and the length of arm 61, as well as the length of arm 62, to 3 cm.

$P_s$ denotes the force necessary for closing and $P_o$ the force necessary for opening the camera. Under the above stated conditions the values of $P_s$ and $P_o$ are as follows:

$$P_s = 1.0 \cdot \frac{3}{5.5} \approx 0.55 \text{ kg.}$$

$$P_o = 1.0 \cdot \frac{5.5}{3} \approx 1.8 \text{ kg.}$$

It will be understood that my present invention is not limited to the specific structures, elements, steps and other specific details described above and illustrated in the drawings and may be carried out with various modifications. For example, the construction shown in Figures 1 and 2 may be applied to cameras having covers of other design and construction than that shown in Figures 1 and 2, for example to cameras having a two-part cover, the parts of which are opened and closed like the leaves of a door, said parts holding the objective board in open position. These and other modifications may be made without departing from the scope of the invention as defined in the appended claims.

What I claim is:

1. In a photographic camera having a cover adapted to be opened to ready for exposure position and to be returned to closed position, and comprising a camera cover lock, shutter means for the camera objective, including means for cocking and releasing the shutter, and a film-transport locking member, in combination a release system comprising a release key adapted to be depressed to a withdrawn position in the interior of the camera and to be moved to an advanced position, said key being provided with means for causing release of the camera cover lock, and being capable of added displacement toward the interior of the camera in closed position of the camera; means for locking the release key in withdrawn position in closed condition of the camera; the locking of said key being released and the locking of the camera cover being subsequently released upon subjecting the key to said added displacement, whereby the camera cover is opened and the release key moved to its advanced position, in which depression of said key effects release of the objective shutter and release of said film-transport locking member.

2. A device as claimed in claim 1, in which release of the objective shutter and release of the film-transport locking member are effected substantially simultaneously.

3. A device as claimed in claim 1, in which the release key does not considerably protrude from the camera casing in closed position of the camera, and the release system comprises spring means for causing advance of the release key to protruding position, in open position of the camera.

4. A device as claimed in claim 1, in which the release key is connected with a pin which is provided with an element for engaging, upon closing the camera cover, means provided on the camera body, for locking said key and pin.

5. A device as claimed in claim 1, in which the release key is connected with a pin which is provided with an element for engaging, upon closing the camera cover, means provided on the camera body, for locking said key and pin; the camera cover lock comprising a double-armed lever pivoted at a fixed point of the camera, one arm of said lever having a hook-shaped end portion adapted to lock the camera cover; said pin being also provided with means for engaging the other end of said double-armed lever, upon depressing said key and pin, in locked position of the camera cover, in order to release the cover lock.

6. A device as claimed in claim 1, in which the release key is connected with a pin which is provided with an element for engaging, upon closing the camera cover, means provided on the camera body, for locking said key and pin; the camera cover lock comprising a double-armed lever pivoted at the camera; one arm of said lever having a hook-shaped end portion adapted to engage an aperture of, and thus lock, the camera cover; the other arm of said lever being provided with a bore and the end of said other arm being connected with a spring permanently urging the lever to locking position; said pin of the release key passing through said bore and being provided with means for causing displacement of said other arm, against the action of said spring, upon depressing said key and pin, in locked position of the camera cover, in order to cause withdrawal of said one arm of the lever from said aperture of the camera cover and thus release the cover lock.

7. A device as claimed in claim 1, in which the release key is connected with a pin which is provided with an element for engaging, upon closing the camera cover, means provided on the camera body, for locking said key and pin; the camera cover lock comprising a double-armed lever pivoted at the camera; one arm of said lever having a hook-shaped end portion adapted to engage an aperture of, and thus lock, the camera cover; the other arm of said lever being provided with a bore and the end of said other arm being connected with a spring permanently urging the lever to locking position; said pin of the release key passing through said bore and being provided with means for causing displacement of said other arm, against the action of said spring, upon depressing said key and pin, in locked position of the camera cover, in order to cause withdrawal of said one arm of the lever from said aperture of the camera cover and thus release the cover lock; said lever extending on both sides of the pin of the release key; the part of the lever extending between said pin and said hook-shaped end of the lever being provided with two projections pivotally supported by registering surface projections of the camera body, said projections being arranged on the upper and lower surface, respectively, of the lever; the upper projection being located near said pin and the lower projection being located at a greater distance from said pin than said first projection, in order to necessitate greater force for opening the camera cover than for closing the same.

8. A device as claimed in claim 1, in which, in addition to the release key, the camera is provided with a second key for cocking the shutter and actuating film transport means, said release key being arranged on the right side of the camera and said second key on the left side of the camera; spring means being provided for urging said second key to protruding position, in open condition of the camera.

References Cited in the file of this patent

FOREIGN PATENTS 711,814     Germany _____ Oct. 7, 1941